(12) United States Patent
Kates

(10) Patent No.: US 7,299,034 B2
(45) Date of Patent: Nov. 20, 2007

(54) SYSTEM AND METHOD FOR WEARABLE ELECTRONICS

(76) Inventor: Lawrence Kates, 1111 Bayside Dr., Corona Del Mar, CA (US) 92625

( * ) Notice: Subject to any disclaimer, the term of this patent is extended or adjusted under 35 U.S.C. 154(b) by 0 days.

(21) Appl. No.: 11/158,932

(22) Filed: Jun. 21, 2005

(65) Prior Publication Data

US 2006/0286972 A1    Dec. 21, 2006

(51) Int. Cl.
*H04M 3/42* (2006.01)
*H04M 1/00* (2006.01)
*H04B 1/38* (2006.01)

(52) U.S. Cl. .................. 455/415; 455/550.1; 455/90.3; 455/575.1; 455/575.6

(58) Field of Classification Search ............... 455/415, 455/550.1, 567, 90.3, 575.1, 575.6
See application file for complete search history.

(56) References Cited

U.S. PATENT DOCUMENTS

| | | | |
|---|---|---|---|
| 4,309,599 A | 1/1982 | Myers | |
| 4,371,945 A | 2/1983 | Karr et al. | |
| 4,466,204 A | 8/1984 | Wu | |
| 4,510,704 A | 4/1985 | Johnson | |
| 4,578,769 A | 3/1986 | Frederick | |
| 4,649,552 A | 3/1987 | Yukawa | |
| 4,651,446 A | 3/1987 | Yukawa et al. | |
| 4,703,445 A | 10/1987 | Dassler | |
| 4,736,312 A | 4/1988 | Dassler et al. | |
| 4,763,287 A | 8/1988 | Gerhaeuser et al. | |
| 4,771,394 A | 9/1988 | Cavanagh | |
| 4,814,661 A | 3/1989 | Ratzlaff et al. | |
| 4,848,009 A | 7/1989 | Rodgers | |
| 4,876,500 A | 10/1989 | Wu | |
| 4,956,628 A | 9/1990 | Furlong | |
| 5,033,013 A | 7/1991 | Kato et al. | |
| 5,052,131 A | 10/1991 | Rondini | |
| 5,125,647 A | 6/1992 | Smith | |
| D341,924 S | 12/1993 | Clement | |
| 5,343,445 A | 8/1994 | Cherdak | |
| 5,775,011 A | 7/1998 | Reitano, Jr. | |
| 5,841,849 A * | 11/1998 | Macor .................. | 379/142.17 |
| 6,218,958 B1 | 4/2001 | Eichstaedt et al. | |
| 6,470,601 B1 | 10/2002 | Zane | |
| 6,519,480 B1 * | 2/2003 | Wicks et al. ................ | 455/566 |
| 6,549,792 B1 * | 4/2003 | Cannon et al. .......... | 455/550.1 |
| 7,116,977 B1 * | 10/2006 | Moton et al. ............... | 455/419 |
| 7,187,952 B2 * | 3/2007 | Lin ............................ | 455/567 |
| 2002/0009989 A1 | 1/2002 | Kanesaka et al. | |
| 2004/0153649 A1 * | 8/2004 | Rhoads et al. ............. | 713/176 |
| 2004/0187184 A1 | 9/2004 | Rubin et al. | |

(Continued)

FOREIGN PATENT DOCUMENTS

DE         10116038 A1 * 10/2002

(Continued)

*Primary Examiner*—Barry Taylor
(74) *Attorney, Agent, or Firm*—Knobbe, Martens, Olsen & Bear, LLP

(57) ABSTRACT

A system for wearable electronics devices configured to intercommunicate through wireless communication and, optionally, to communicate with other electronic devices such as cellular telephones, computers, computer networks, etc. is described. In one embodiment, a communication module receives information from one or more devices and provides audio and, optionally, stimulatory information to the wearer. In one embodiment, an electronic device is provided in a shoe. In one embodiment, a wireless (or wired) earpiece is provided to provide audio information to the user. In one embodiment, the shoe-mounted device includes a display to show time, caller-id information, temperature, pulserate, etc.

20 Claims, 5 Drawing Sheets

U.S. PATENT DOCUMENTS

| | | | |
|---|---|---|---|
| 2005/0042014 A1* | 2/2005 | Lahr | 400/490 |
| 2005/0084075 A1* | 4/2005 | Kotzin | 379/38 |
| 2006/0148490 A1* | 7/2006 | Bates et al. | 455/456.1 |
| 2006/0214806 A1* | 9/2006 | Clifford et al. | 340/573.1 |

FOREIGN PATENT DOCUMENTS

| | | |
|---|---|---|
| EP | 1213896 A1 | 6/2002 |
| WO | WO 01-52718 A2 | 7/2001 |
| WO | WO 01-52718 A3 | 7/2001 |
| WO | WO 01-99450 A2 | 12/2001 |
| WO | WO 01-99450 A3 | 12/2001 |
| WO | WO 03-039014 A1 | 5/2003 |
| WO | WO 2004-036891 A2 | 4/2004 |

* cited by examiner

SYSTEM AND METHOD FOR WEARABLE ELECTRONICS

BACKGROUND OF THE INVENTION

1. Field of the Invention

The present invention relates to a system and method for electronic devices that can be worn or attached to clothing.

2. Description of the Related Art

Wearable computing is a term used to describe the integration of electronics into clothing. For example, electronic assistants are supposed to always be available, without getting on the user's nerves. Clothing is a part of everyday life and for this reason they are candidates for the integration of such assistants. Clothiers have been trying to find a fashionable combination of electronics and garments, but have failed to find success.

SUMMARY

These and other problems are solved by the use of wearable electronic devices configured to intercommunicate through wireless communication and, optionally, to communicate with other electronic devices such as cellular telephones, computers, computer networks, etc. In one embodiment, an instrumented communication module receives information from one or more devices and provides audio and, optionally, stimulatory information to the wearer. In one embodiment, an electronic device is provided in a shoe. In one embodiment, an electronic device is provided in one or more ankle bracelets. In one embodiment, an electronic device is provided in the wearer's shoes. In one embodiment, a wireless (or wired) earpiece is provided to provide audio information to one or both ears. In one embodiment, audio information is provided through one or more transducers that couple sound through bones. The use of bone coupling allows the wearer to hear the sound information from the communication module in concert with normal hearing.

In one embodiment, the communication and information system communicates with RFID tags located in carpeting. In one embodiment, the communication and information system communicates with RFID tags located along walls and/or baseboards. In one embodiment, the communication and information system communicates with RFID tags located along tracks in the floor. In one embodiment, the communication and information system communicates with RFID tags located in furniture, cabinetry, containers (e.g., pill bottles, food containers, etc.). In one embodiment, the communication and information system relays information from the RFID tags to a computer monitoring system.

In one embodiment, the communication and information system includes a computer system provided to a first wireless communication system and a communication module provided to a second wireless communication system. The communication module has an identification code and is configured to communicate with the computer system using two-way handshaking communication such that the computer system can send instructions to the communication module and receive acknowledgement of the instructions from the communication module. The communication module can send data to the computer system and receive acknowledgements from the computer system according to the identification code. The computer system is configured to send instructions to the communication module and receive data from the communication module related to one or more actions of the user wearing the communication module. The computer system is configured to keep records of at least a portion of the user's actions (e.g., distance traveled, biometric data such as pulse rate, temperature, etc.).

In one embodiment, the communication module includes at least one of, an acoustic input device, an acoustic output device, a vibrator device, an RFID tags reader, a GPS receiver, an inertial motion unit (e.g., accelerometers or gyroscopes), etc. In one embodiment, the communication and information system includes at least one of, an RF location system, a clock, a cellular telephone system, a communication link to a cellular telephone, etc.

In one embodiment, the communication module includes an acoustic input device. In one embodiment, the communication module includes an acoustic output device. In one embodiment, the communication module includes a vibrator device. In one embodiment, the communication module includes a keypad input device. In one embodiment, the communication module includes an infrared receiver. In one embodiment, the communication module includes an infrared transmitter. In one embodiment, the communication module includes a GPS receiver. In one embodiment, the communication module includes an inertial motion unit. In one embodiment, the communication module includes a 2-axis inertial motion unit. In one embodiment, the communication module includes a 4-axis inertial motion unit. In one embodiment, the communication module includes an accelerometer. In one embodiment, the communication module includes an RF location system. In one embodiment, the communication module includes an RFID electronic device.

In one embodiment, the communication device includes a cellular telephone. In one embodiment, the communication device includes a GPS receiver. In one embodiment, the communication device configured to obtain location information, speed of travel, distance traveled, distance walked, etc. In one embodiment, the communication device is configured to provide waypoint information to the user. In one embodiment, the communication device is configured to provide GPS waypoint information to the user.

In one embodiment, the communication device is configured to receive waypoint information from a cellular telephone network. In one embodiment, the communication device is configured to send location information using a cellular telephone network. In one embodiment, the communication device is configured to receive building map information when the user enters a building. In one embodiment, the communication device is configured to receive local area map information.

In one embodiment, the communication device is configured to store sidewalk map information for a selected area. In one embodiment, the sidewalk map information includes locations of stores, restaurants, addresses, etc.

In one embodiment, the communication device is configured to track movements and compute a return path for the user to return to a specified starting point.

In one embodiment, the system includes an inertial motion unit. In one embodiment, the communication device configured to use location data and data from the inertial motion unit to determine which direction the user is facing. In one embodiment, the system includes an electronic compass. In one embodiment, the inertial motion unit is configured to operate in a manner similar to a pedometer.

DETAILED DESCRIPTION

Figure 1:
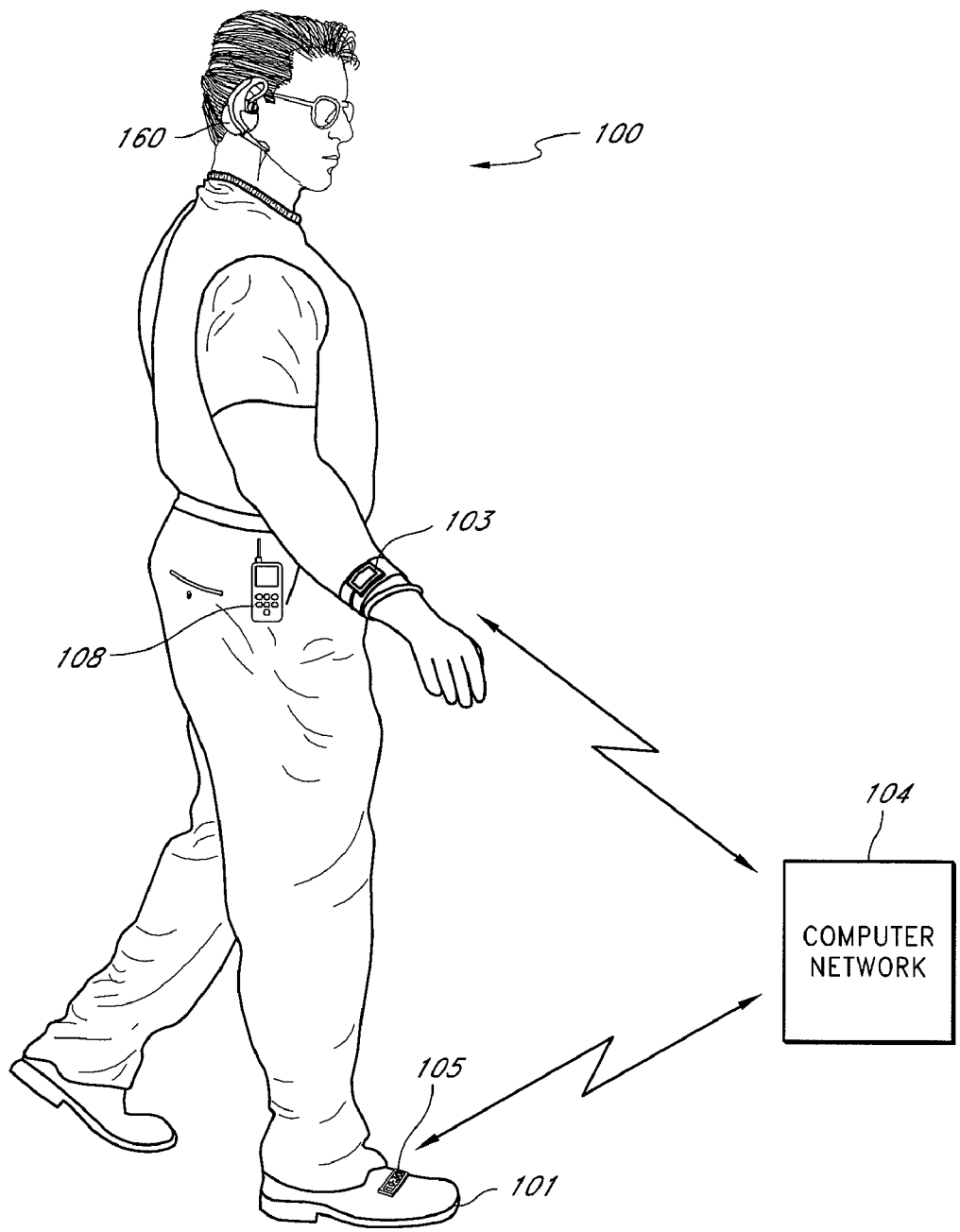
FIG. 1 shows a user wearing elements of a wearable communication and information system.

FIG. 1 shows a user wearing elements of a management and information system 100. In FIG. 1, the user is shown wearing a communication module 103, and a headset 160. A shoe-mounted module 105 is also shown. As described below, the communication module 103, and a headset 160 allows the user to communicate, navigate, keep track of time, etc. The communication module 103 can be configured to be worn on the wrist like a watch, integrated into clothing, jewelry, etc. Similarly, the shoe-mounted module 105 can also be configured to be worn as part of an attachment to user's clothing, as jewelry, etc.

In the system 100, the elements shown in FIG. 1 work together to provide functionality and capability not provided by existing devices such as cellular telephones, Personal Digital Assistants, etc. In one embodiment, the wireless communication module 103 (or shoe-mounted module 105) can communicate with a wireless computer (or computer network) 104. The communication module 103 communicates with one or more electronic devices carried by the user.

Figure 2:
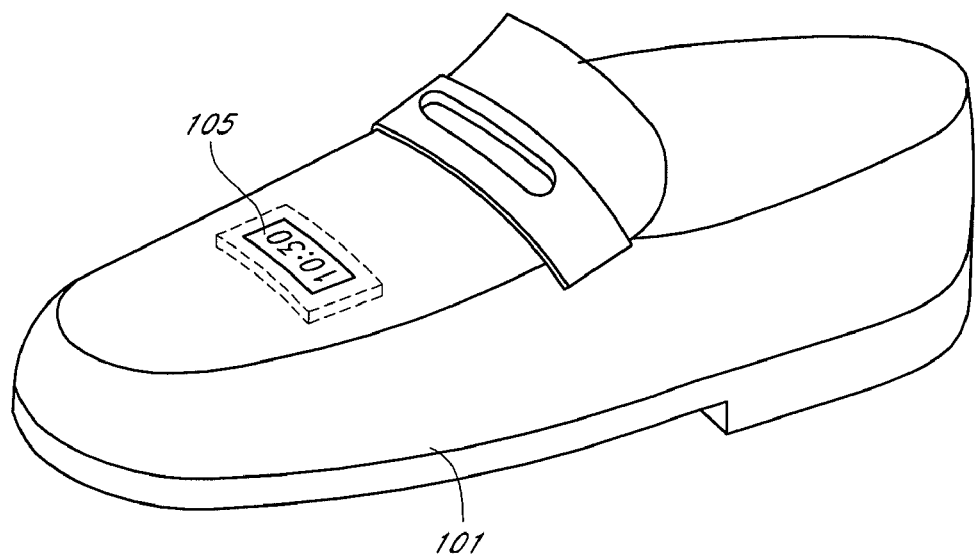
FIG. 2 shows a wearable communication and information module configured in a shoe.
Figure 3:
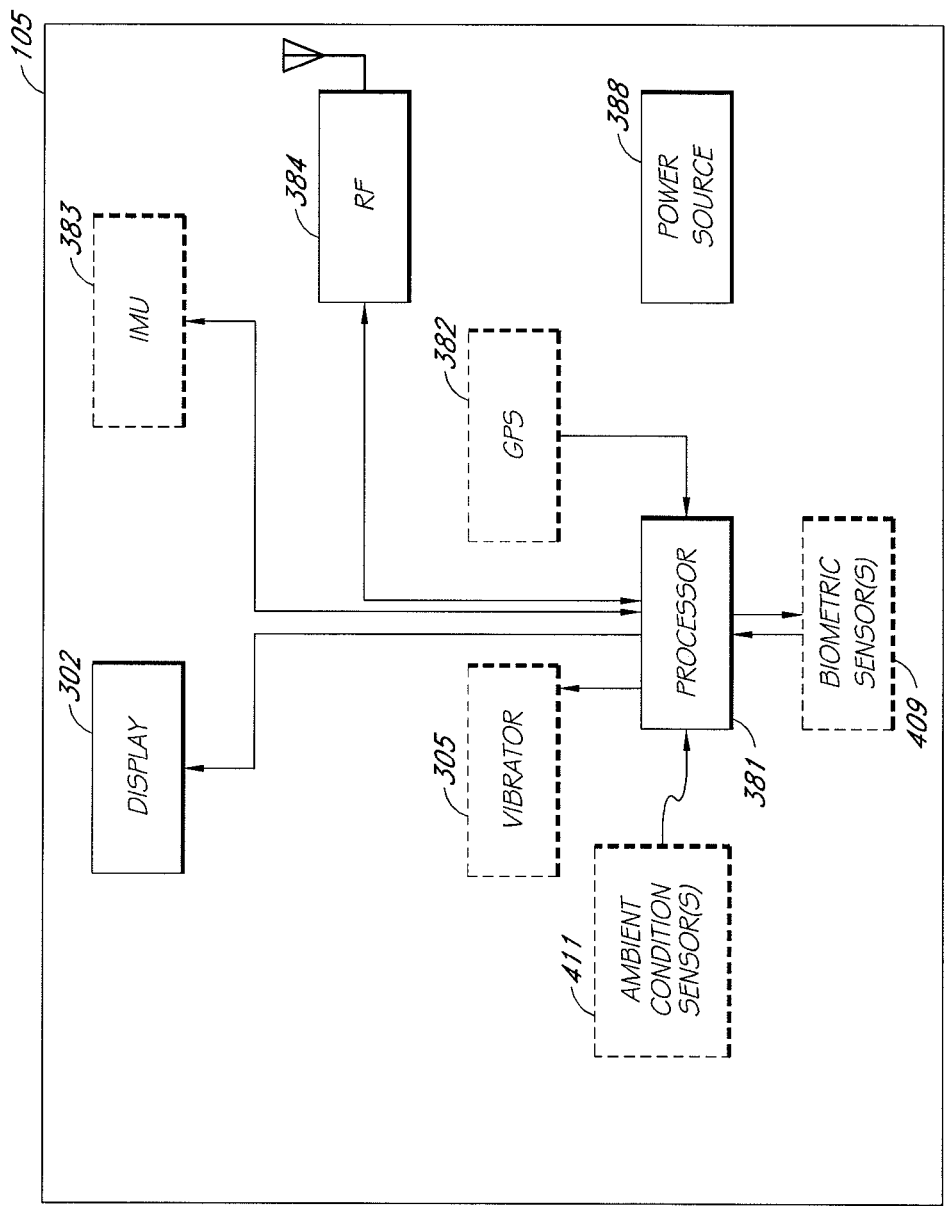
FIG. 3 is a block diagram of the shoe-based communication and information module shown in FIG. 2.

FIG. 2 shows the shoe-mounted module 105 provided to the shoe 101 with a display positioned to be read by the wearer. FIG. 3 is a block diagram of the shoe-mounted module 105. The module 105 can be worn on the ankles, built into the user's shoes, attached to the user's shoes, and/or provided to the user's shoe. The module 105 includes a display 302 provided to a processor 381. In one embodiment, an optional IMU 383 is provided to the processor 381 to provide information about the movement of the user's feet and/or shoe. In one embodiment, a vibrator 305 is provided to the processor 381. In one embodiment, an optional radio navigation receiver 382 (e.g., a GPS receiver, GLONASS receiver, etc.) is provided to the processor 381. In one embodiment, an optional RF communication system 384 is provided to the processor 381. As shown in FIG. 3, the vibrator 305, the radio navigation receiver 382, the IMU 383, and the RF system 384 are optional.

The processor 381 uses the display 302 to provide information such as, for example, time of day, date, caller-id (from the cellular telephone), distance traveled, etc. Information such as time of day can be generated by the processor 381 without the need for the optional RF system 384. Other information, such as, for example, Caller-Id information, is received via the RF system 384 and then provided to the user via the display 302.

The optional vibrator 305 can be used to alert the user and/or to provide feedback to the user.

In one embodiment, the shoe-mounted module 105 provides IMU information to the communication module 103. The communication module 103 uses the information IMU to ascertain the direction of travel, speed, and path of the user. The communication module 103 uses the headset 160 to provide audible direction and route-finding information to the user. The user can use a microphone in the headset 160 to send voice commands to the communication module 103 and/or to communicate through a cellular telephone 108. The user can also use buttons on a keypad on the communication module 103 to control the operation of the system and input commands into the system.

In one embodiment, the communication module 103 is omitted and the shoe-mounted module 105 communicates with the cellular telephone 108 and/or headset 160. The display on the shoe-mounted module 105 can, thus, be used to display information, such as, for example, caller id information, text messages, etc., from the cellular telephone.

Figure 4:
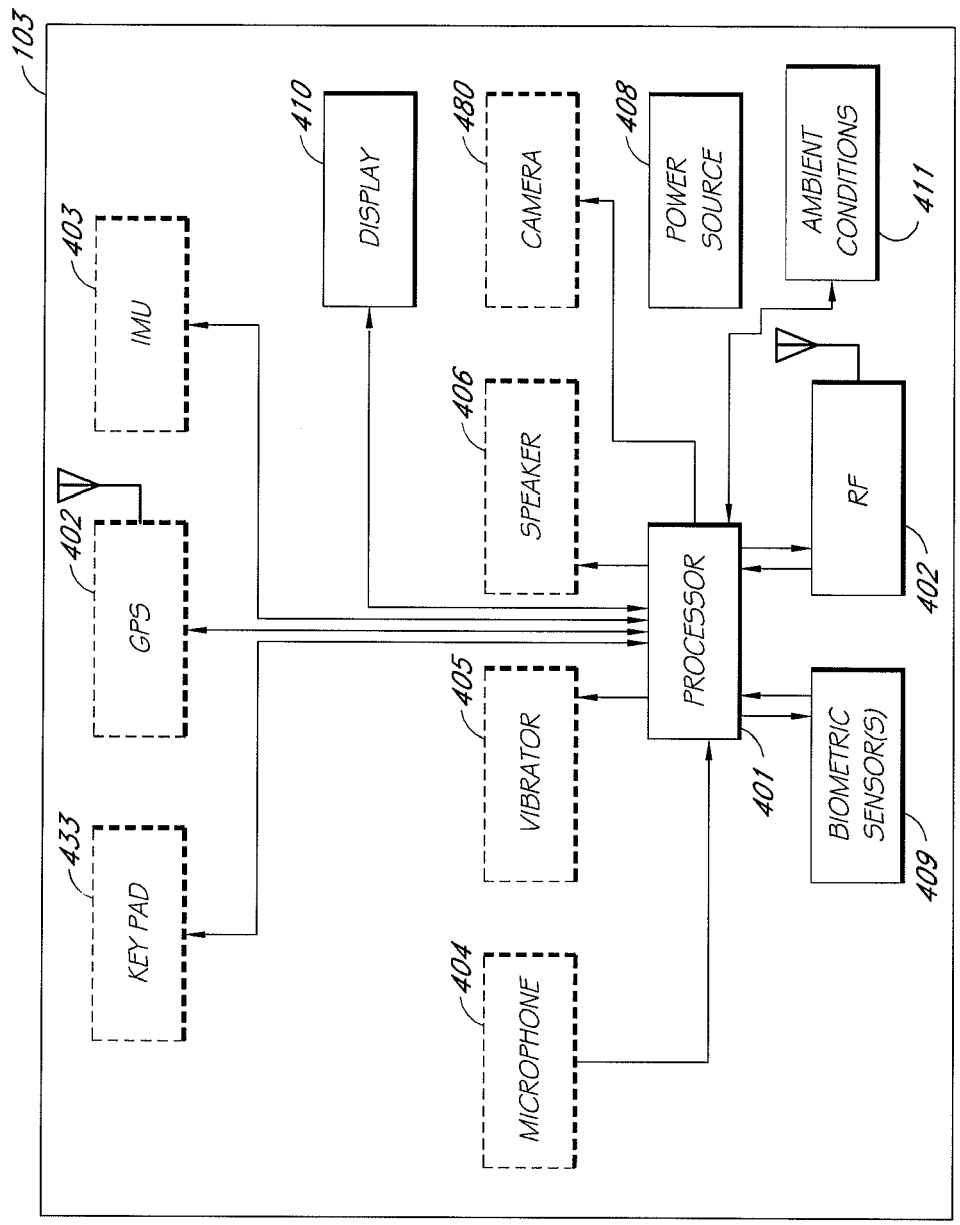
FIG. 4 is a block diagram of a communication and information module that can be configured to be carried in a pocket, worn on the wrist, integrated into clothing, etc.

FIG. 4 is a block diagram of the communication (and information) module 103. The communication module 103 is configured to be carried and/or to be worn on the wrist, belt, chest, etc. In the communication module 103, an optional sound sensing device (e.g., a microphone) 404, an optional vibration device 405, an optional sound producing device (e.g., a loudspeaker) 406, and a RF system 402 are provided to a processor 401. A display 410, a radio navigation receiver 402, an Inertial Motion Unit (IMU) 403, one or more ambient condition sensors 411, and/or one or more biometric sensors 409 are optionally provided to the processor 401. The radio navigation receiver can be, for example, a GPS receiver, a GLONASS receiver, a differential GPS receiver, etc.

The sound sensing device is configured to sense sound waves (sonic and/or ultrasonic) such as, for example, a microphone, a transducer, etc. For convenience, and without limitation, the sound sensing device is referred to herein as a microphone with the understanding that other acoustic transducers can be used as well. For convenience, and without limitation, the sound producing device is referred to herein as a loudspeaker with the understanding that the sound producing device is configured to produce sound waves such as, for example, a loudspeaker, a transducer, a buzzer, etc. A power source 403 provides power for powering the communication device 103. In one embodiment, each of the microphone 404, the vibration device 405, the loudspeaker 406, the sensors 409, 411, the IMU 403, the radio navigation receiver 402, and the keypad and/or buttons 433 are optional and can be omitted. The communication module 103 can also include a light (not shown) for providing visual indications to the instructor, or to the video cameras 106. The communication module 103 can be configured by communication with a computer, cell phone, and/or by using the buttons 433, etc.

The microphone 404 is used to pick up sound waves such as, for example, sounds produced by the user, sounds produced by other people, and/or acoustic waves produced by an acoustic location device (sonic or ultrasonic), etc. In one embodiment, the system 100 includes facial-recognition processing to help the user know who is in the room, at door, etc. The processor 401 processes the sounds picked up by the microphone and, if needed, sends processed data to the computer system 104 and/or communication module 103 for further processing. The loudspeaker 406 is used to produce pleasant and/or warning sounds for the user and to provide information and instructions to the user. The microphone 404 and/or loudspeaker 406 can also be used in connection with an acoustic location system to locate the user using acoustic waves. In an acoustic location system, the microphone 404 and/or loudspeaker 406 communicate acoustically with acoustic sources or sensors placed about the house or yard to locate the user. The vibrator can be used in a manner similar to a vibrator on a cellular telephone to alert the user without disturbing other people in the area. The vibrator can also be used to alert the user to abnormal or potentially dangerous conditions (e.g., off course, approaching a stairwell, etc.). Blind people tend to rely more on their sense of hearing than sighted people. Thus, in one embodiment, the vibrator can be configured to provided different types of vibrations (e.g., different frequency, different intensity, different patterns, etc.) to send information to the user without interfering with the user's hearing.

The RF system 402 communicates with the computer network 104 either directly or through repeaters. In one embodiment, the RF system 402 provides two-way communications such that the communication module 103 can send information to the computer system 104 and/or cell phone 108 and receive instructions from the computer system 104 and/or cell phone 108. In one embodiment, the computer system 104 and/or communication module 103 and the cell phone 108 communicate using a handshake protocol, to verify that data is received.

In FIG. 4, the communication module 103 includes one or more location and tracking systems, such as, for example, a GPS location system 402, an IMU 403, etc. The tracking systems can be used alone or in combination to ascertain the location of the user and to help the user navigate to a desired location. The GPS location system 402 and IMU 403 are provided to the processor 401 and powered by the power source 408. The processor 401 controls operation of the GPS location system 402, the IMU 403, etc., and controls when the power source delivers power to the location and tracking systems. One or more biometric sensors 409 (e.g., temperature sensors, pulserate sensors, etc.) are provided to the processor 401. In one embodiment, one or more RFID tags with biometric sensors are implanted in the user and the biometric sensors 409 includes an RFID tag reader to read the implanted sensors. In one embodiment, one or more devices, such as, for example, pacemakers, etc. are implanted in the user and the biometric sensors 409 includes the capability to communicate with the one or more medical devices.

In one embodiment, the RF system 402 includes a receive capability to receive radio location signals from one or more radio location transmitters as part of a radio location system.

The microphone 404 can be used to allow the user to send voice commands to the system 100, to talk on the cellular telephone 108, to record voice messages, etc.

The communication module 103 sends low-battery warnings to the computer system 104 and/or to the user.

Figure 5:
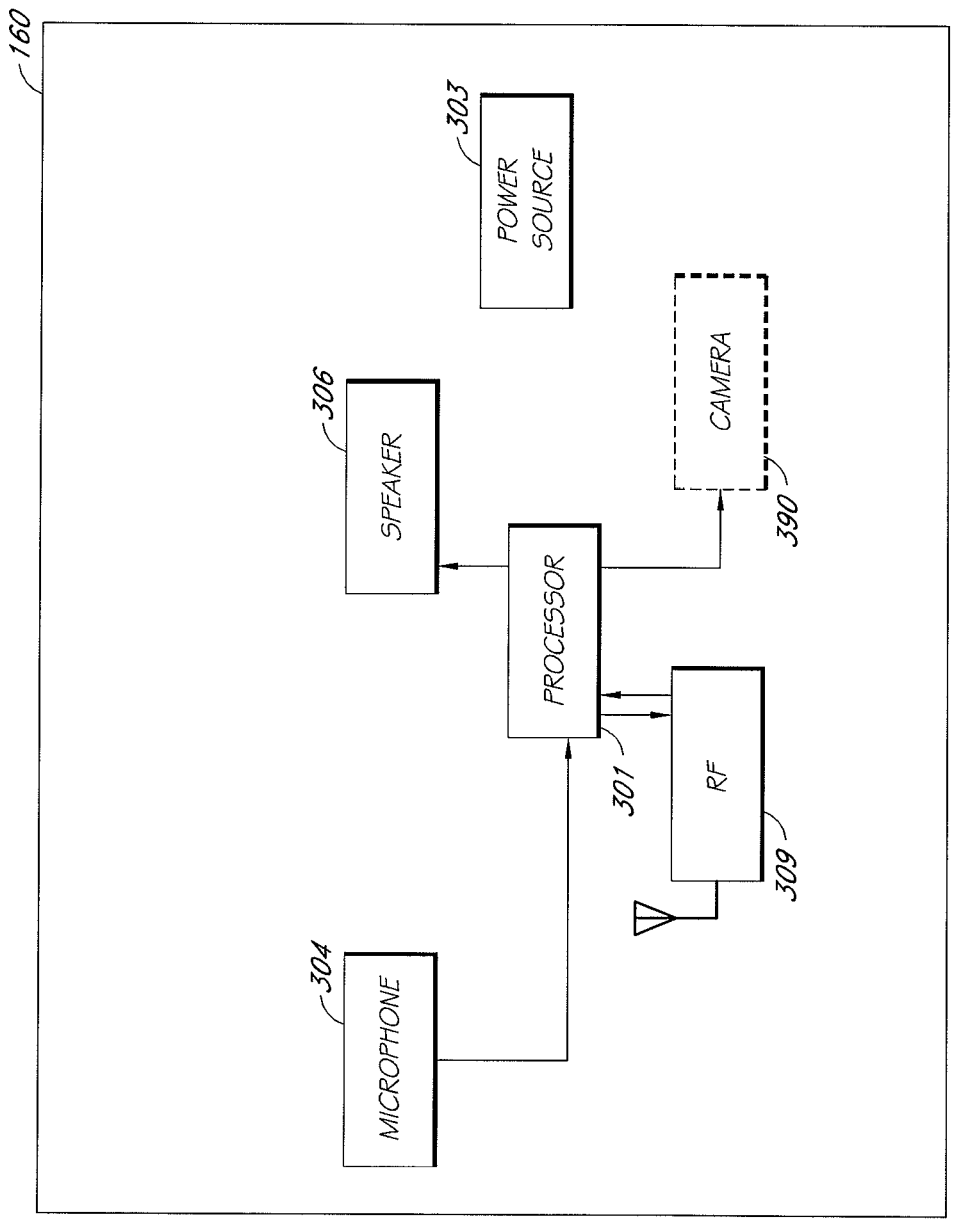
FIG. 5 is a block diagram of the earpiece module.

FIG. 5 is a block diagram of the ear module 160. The module 160 includes the microphone 304, the speaker 306 and the RF system 309 provided to the processor 301. In one embodiment, the module 160 includes, or is similar to, a bluetooth headset for a cellular telephone in that it provides audio communication with the communication module 103 and/or cellular telephone 108. In one embodiment, the headset 160 also includes a camera 390 provided to the processor 301.

The various location systems have benefits and drawbacks. In one embodiment, the system 100 uses a combination of one or more of a GPS system, an IMU, and/or a radio-location system to locate the user. One or more of these systems are used synergistically to locate the user, to allow the user to keep track of distance traveled, and to help the user navigate to a desired location.

The IMU 403 uses one or more accelerometers and/or gyroscopes to sense motion of the communication module. The motion can be integrated to determine location. The IMU 403 provides relatively low power requirements and relatively high short-term accuracy. The IMU provides relatively lower long-term accuracy. An Inertial Motion Units (IMU) unit will work indoors or outdoors, and typically consumes less power than other location systems. However, IMU systems are prone to drift over time and tend to lose accuracy if not recalibrated at regular intervals. In one embodiment, the IMU is recalibrated from time to time by using data from one or more of the RFID tags, GPS, acoustic, IR, and/or RF location systems. In one embodiment, the IMU 403 is used to reduce power requirements for the GPS, IR, and/or RF location systems. In one embodiment, the GPS, IR, and/or RF location systems are placed in a low-power or standby mode when the IMU 403 senses that the communication module 103 is motionless or relatively motionless. If the IMB 403 senses that the communication module 103 is relatively motionless (e.g., motionless or moving at a relatively low velocity) then the user is either not moving or is moving slowly enough that tracking is not immediately needed. In one embodiment, the IMU 403 is a 4-axis system and thus, motion of the communication module 103 in any direction is sensed as motion and can be used to activate one or more of the other sensing systems. Thus, for example, if the user has been lying down and then stands up, the "up" motion will be sensed by the IMU 403 and the communication module will activate one or more tracking systems.

In one embodiment, the system 100 assumes that the user will not move at a relatively constant and relatively low velocity for any significant length of time. Thus, in one embodiment, the IMU self-calibrates to a constant offset error (e.g., a constant slope in the X, Y or Z direction) and a deviation from that constant X, Y offset error (e.g., a change in slope) is recognized as a movement by the user.

In one embodiment, the IMU 403 is at least a 2-axis IMU that senses motion in at least two directions. In one embodiment, the IMU 403 is at least a 4-axis IMU that senses motion in at least three directions. In one embodiment, the IMU provides data used to determine the gait of the user, such as, for example, running, walking, going upstairs, going downstairs, stumbling, limping, etc.

The IMU can be used alone or in combination with other tracking devices to obtain feedback on the motion of the user. Thus, for example, if the user has indicated a desire to go to room 25 of a building, the information system can provide guidance information to help the user. In one embodiment, guidance information includes instructions (e.g., turn left, walk straight ahead 40 feet, etc.). In one embodiment, guidance information can include audio tone information reminiscent of an airplane glideslope information system. Thus, for example, the information system can play a tone in the left ear (or couple sound into the bones of the left side of the body ) if the user is veering too far left. In one embodiment, the tones become louder as the informational error increases.

The IMU 403 can measure both dynamic acceleration as well as static acceleration forces, including acceleration due to gravity, so the IMU 403 can be used to measure tilt as well as horizontal and vertical motion. When the IMU 403 is oriented so both the X and Y axis are parallel to the earth's surface, it can be used as a two axis tilt sensor with a roll and pitch axis. Ninety degrees of roll would indicate that the user is lying on its side. In addition, when the IMU 403 indicates no movement at all, regardless of the orientation of the user, the user is asleep or inactive and the system is powered down, as described above. Thus, the IMU 403 can detect when the user is not standing.

The Global Positioning System (GPS) is accurate but often does not work well indoors, and sometimes does not have enough vertical accuracy to distinguish between floors of a building. GPS receivers also require a certain amount of signal processing and such processing consumes power. In a limited-power device such as the communication module 103, the power consumed by a GPS system can reduce battery life. However, GPS has the advantages of being able to operate over a large area and is thus, particularly useful when locating a user that has escaped a confined area or is out of the range of other locating systems.

GPS tends to work well outdoors, but poorly inside buildings. Thus, in one embodiment, the system 100 uses GPS in combination with the IMU and/or in combination with RFID tags when such tags are available. Thus, using the system 100, the user can navigate through a first building, exit the building and walk to a second building, and then navigate through the second building. The system 101 can use different information systems during different portions of the user's journey.

In one embodiment, a building includes a data port near the entrance that provides information to the system 100 regarding the map of the building. When the user enters the building, the system 100 obtains the building map information from the data port so that the user can navigate through the building. In one embodiment, the map information provided by the data port includes dynamic information, such as, for example, construction areas, restrooms closed for cleaning, etc.

In one embodiment, the GPS system 402 operates in a standby mode and activates at regular intervals or when instructed to activate. The GPS system can be instructed by the computer 104 and/or to the user or the communication module to activate. When activated, the GPS system obtains a position fixed on the user (if GPS satellite signals are available) and updates the IMU. In one embodiment, a GPS system is also provided to the computer system 104 and/or communication module 103. The computer system uses data from its GPS system to send location and/or timing data to the GPS system 402 in the communication module 103 allowing the GPS system 402 to warm start faster, obtain a fix more quickly, and therefore, use less power.

In one embodiment, the system 100 uses the ambient sensors 411 to monitor ambient conditions such as, for example, temperature, humidity, sunlight, etc.

In one embodiment, one or more of the wearable modules of the system 100 includes an RF communication system for communication. Thus, the discussion that follows generally refers to the communication module 103 as an example, and not by way of limitation. Similarly, the discussion below generally refers to the computer 104 by way of example, and not limitation. It will also be understood by one of ordinary skill in the art that repeaters 113 are useful for extending the range of the communication module 103 but are not required in all configurations. It will also be understood that the computer 104 can be a computer network, a laptop computer, a handheld computer, a personal digital assistant, a cellular telephone, etc.

In one embodiment, the communication module 103 has an internal power source (e.g., battery, solar cell, fuel cell, etc.). In order to conserve power, the communication module 103 is normally placed in a low-power mode. In one embodiment, the communication module 103 provides bi-directional communication and is configured to receive data and/or instructions from the other modules. Thus, for example, the computer 104 can instruct the communication module 103 to perform functions, to go to a standby mode, to wake up, to report battery status, to change wake-up interval, to run self-diagnostics and report results, etc. In one embodiment, the communication module 103 reports its general health and status on a regular basis (e.g., results of self-diagnostics, battery health, etc.).

In one embodiment, the communication module 103 samples, digitizes, and stores audio data from the microphone 304 when such data exceeds a volume threshold and/or when other sensors indicate that the audio data should be digitized and stored. For example, when sending voice commands, the user can press a button on the keypad 433 to indicate that a voice command is being given. The user can also use the keypad 433 to enter commands to the communication module 103.

In one embodiment, the communication module 103 provides two wake-up modes, a first wake-up mode for taking sensor measurements (and reporting such measurements if deemed necessary), and a second wake-up mode for listening for instructions from the central computer 104 and/or to the keyboard 433. The two wake-up modes, or combinations thereof, can occur at different intervals.

In one embodiment, the communication module 103 use spread-spectrum techniques to communicate with the modules of the system 100. In one embodiment, the communication module 103 uses Code Division Multiple Access (CDMA) techniques. In one embodiment, the communication module 103 uses frequency-hopping spread-spectrum. In one embodiment, the communication module 103 uses Bluetooth communication techniques. In one embodiment, the communication module 103 uses a combination of techniques to toke to the various modules of the system 101, the cellular telephone 108, the computer 104, etc.

In one embodiment, an embedded RFID tag in the user includes one or more biometric sensors to allow the system 101 to monitor the health and condition of the user. In one embodiment, the embedded RFID tags include a temperature sensor to allow the monitoring system to monitor the user's temperature. In one embodiment, the embedded RFID tag includes one or more biometric sensors to measure the user's health and well-being, such as for example, temperature, blood pressure, pulse, respiration, blood oxygenation, etc.

Radio frequency identification, or RFID, is a generic term for technologies that use radio waves to identify people or objects. There are several methods of identification, but the most common is to store a serial number that identifies a person or object, and perhaps other information, on a microchip that is attached to an antenna (the chip and the antenna together are called an RFID transponder or an RFID tag). The antenna enables the chip to transmit the identification information to a reader. The reader converts the radio waves reflected back from the RFID tag into digital information that can then be passed on to computers that can make use of it.

An RFID system includes a tag, which is made up of a microchip with an antenna, and an interrogator or reader with an antenna. The reader sends out electromagnetic waves. The tag antenna is tuned to receive these waves. A passive RFID tag draws power from field created by the reader and uses it to power the microchip's circuits. The chip then modulates the waves that the tag sends back to the reader and the reader converts the new waves into digital data.

Radio waves travel through most non-metallic materials, so they can be embedded in packaging or encased in protective plastic for weather-proofing and greater durability. RFID tags have microchips that can store a unique serial number for every product manufactured-around the world.

Active RFID tags have a battery, which is used to run the microchip's circuitry and to broadcast a signal to a reader (the way a cell phone transmits signals to a base station). Passive tags have no battery. Instead, they draw power from the reader, which sends out electromagnetic waves that induce a current in the tag's antenna. Semi-passive tags use a battery to run the chip's circuitry, but communicate by drawing power from the reader. Active and semi-passive tags are useful for tracking high-value goods that need to be scanned over long ranges, such as railway cars on a track, but they cost relatively more. Passive RFID tags cost less than active or semi-active tags.

In one embodiment, the communication module 103 and/or the shoe-mounted module 105 can be used in connection with the cell phone 108. Although the earpiece 160 can also be provided with an answer button, the earpiece 160 does not typically have a display to show caller information and thus, does not provide a convenient method for call screening. In one embodiment, the communication module 103 and/or the shoe-mounted module 105 receives a message from the cell phone 108 when an incoming call is detected. Information, such as, for example, the caller's telephone number, name, picture, etc., is displayed on the communication module 103 and/or the shoe-mounted module 105. In one embodiment, if the user wishes to receive the call, the user can press a button on the communication module 103 to cause the communication module 103 to send an answer command to the cell phone 108. In one embodiment, if the user wishes to receive the call, the user can press a button on the earpiece 160 to send an answer command to the cell phone 108. In one embodiment, if the user wishes to receive the call, the user can use a wrist motion (e.g., a flick of the wrist, etc.) to cause the communication module 103 to send an answer command to the cell phone 108. In one embodiment, if the user wishes to receive the call, the user can use a defined foot tap (e.g., single tap, double tap, sideways tap, etc.) or foot motion to cause the shoe-mounted module 105 to send an answer command to the cell phone 108. Once the call is answered, the user can communicate with the cell phone 108 through the earpiece 160, through a hand-free module (e.g., a hands-free microphone and speaker mounted in a vehicle, office, etc.), and the like. This allows the user to screen calls without having to pull the cell phone 108 from a pocket, purse, briefcase, etc.

Although various embodiments have been described above, other embodiments will be within the skill of one of ordinary skill in the art. Thus, for example, although the above disclosure describes communication using a Bluetooth protocol, such description is used by way of example, and not by way of limitation. One of ordinary skill in the art will recognize that other wireless and/or wired communication protocols and techniques can be used with Bluetooth and/or in the alternative. The invention is limited only by the claims that follow.

What is claimed is:

1. An apparatus configured to be worn by a user comprising:

a receiver configured to receiving caller identification information from a cellular telephone; and a display configured to display said caller identification information, said display configured such that said caller identification information can be viewed while said module is being worn by the user, wherein said apparatus is configured to send an answer command to said cellular telephone when a prescribed user-generated motion is detected by an inertial motion sensor.

2. The apparatus of claim 1, wherein said apparatus is configured to be worn on the wrist.

3. The apparatus of claim 1, wherein said apparatus is configured to be provided to a shoe.

4. The apparatus of claim 1, wherein said apparatus is configured to be attached to clothing.

5. The apparatus of claim 1, further comprising a clock module configured to display time of day on said display.

6. The apparatus of claim 1, further comprising a calendar module configured to display calendar information on said display.

7. The apparatus of claim 1, further comprising a satellite navigation receiver.

8. The apparatus of claim 1, further comprising an inertial motion unit configured to detect motion of said apparatus.

9. The apparatus of claim 1, further comprising a camera.

10. The apparatus of claim 1, further comprising a vibrator.

11. The apparatus of claim 1, further comprising at least one biometric sensor.

12. The apparatus of claim 11, wherein said biometric sensor comprises a temperature sensor.

13. The apparatus of claim 11, wherein said biometric sensor is configured to read an REID sensor embedded in the user.

14. The apparatus of claim 11, wherein said biometric sensor is configured to communicate with an embedded medical device.

15. The apparatus of claim 1, further comprising at least one ambient condition sensor.

16. The apparatus of claim 15, wherein said ambient condition sensor comprises a temperature sensor.

17. The apparatus of claim 15, wherein said ambient condition sensor comprises a humidity sensor.

18. The apparatus of claim 15, wherein said ambient condition sensor comprises an air-pressure sensor.

19. The apparatus of claim 1, further comprising an inertial motion unit configured to detect motion of said apparatus and to compute distance walked according to said motion.

20. The apparatus of claim 1, further comprising an inertial motion unit and a GPS receiver configured to detect motion of said apparatus and to compute distance walked according to said motion.

* * * * *

UNITED STATES PATENT AND TRADEMARK OFFICE
CERTIFICATE OF CORRECTION

| | | |
|---|---|---|
| PATENT NO. | : 7,299,034 B2 | Page 1 of 1 |
| APPLICATION NO. | : 11/158932 | |
| DATED | : November 20, 2007 | |
| INVENTOR(S) | : Lawrence Kates | |

It is certified that error appears in the above-identified patent and that said Letters Patent is hereby corrected as shown below:

In column 6 at line 14, change "IMB" to --IMU--.

In column 10 at line 34, in Claim 13, change "REID" to --RFID--.

Signed and Sealed this

Sixth Day of October, 2009

David J. Kappos
*Director of the United States Patent and Trademark Office*